United States Patent [19]

Mayer et al.

[11] 4,451,900

[45] May 29, 1984

[54] METHOD AND APPARATUS FOR TEXT EDITING DISPLAY

[75] Inventors: Steven T. Mayer, Essex, Conn.; Lawrence D. Emmons, Grass Valley, Calif.

[73] Assignee: Atari, Inc., Sunnyvale, Calif.

[21] Appl. No.: 335,471

[22] Filed: Dec. 29, 1981

[51] Int. Cl.³ .............................................. G06F 9/00
[52] U.S. Cl. .................................................... 364/900
[58] Field of Search ......................................... 364/900

[56] References Cited

U.S. PATENT DOCUMENTS 4,195,353  3/1980  Abe et al. ............................ 364/900

Primary Examiner—Raulfe B. Zache
Attorney, Agent, or Firm—Townsend and Townsend

[57] ABSTRACT

In a word processing system that includes a printer for printing text material and a display screen for viewing portions of the display material, a graphical representation of a page of text is displayed for editing purposes, the graphical representation including a plurality of identically formed display elements each corresponding to one of the characters of the text.

31 Claims, 6 Drawing Figures

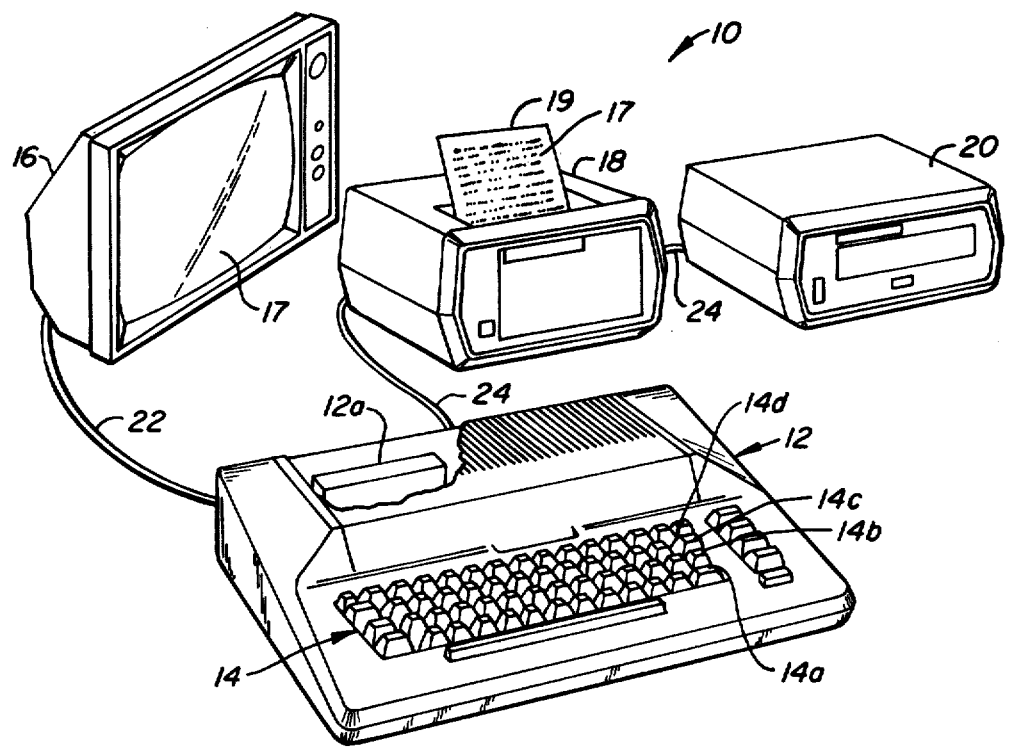
FIG._1.
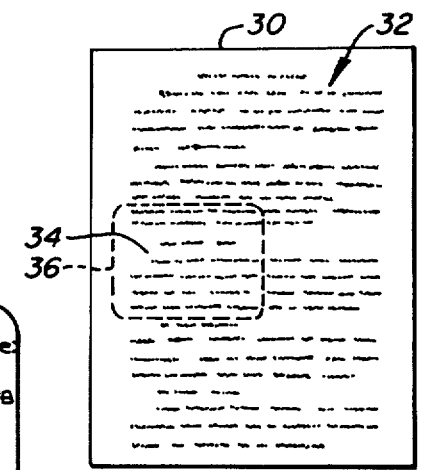
FIG._2A.
FIG._2B.

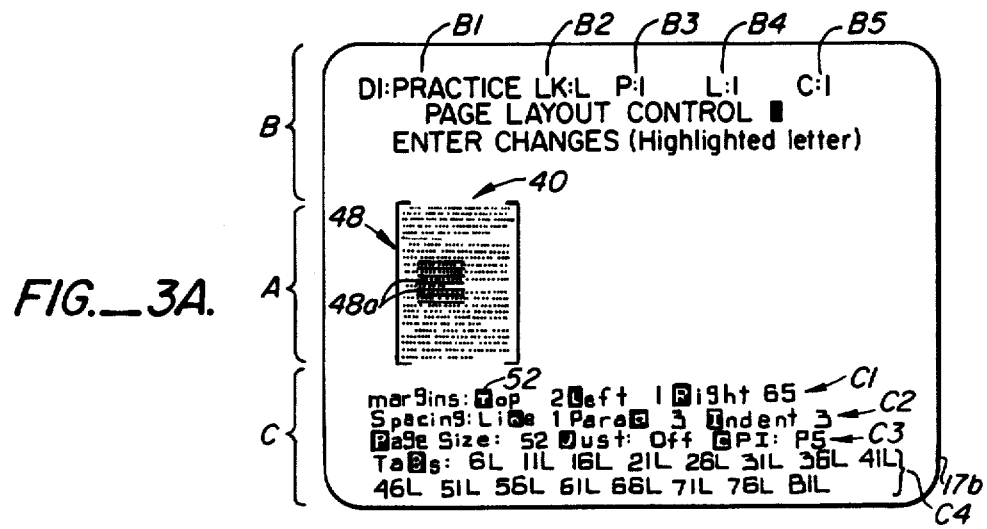
FIG._3A.
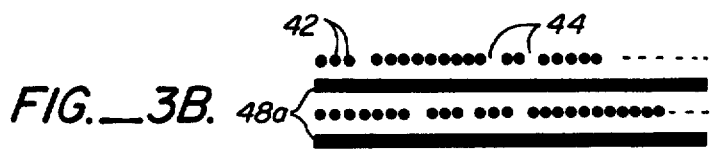
FIG._3B.
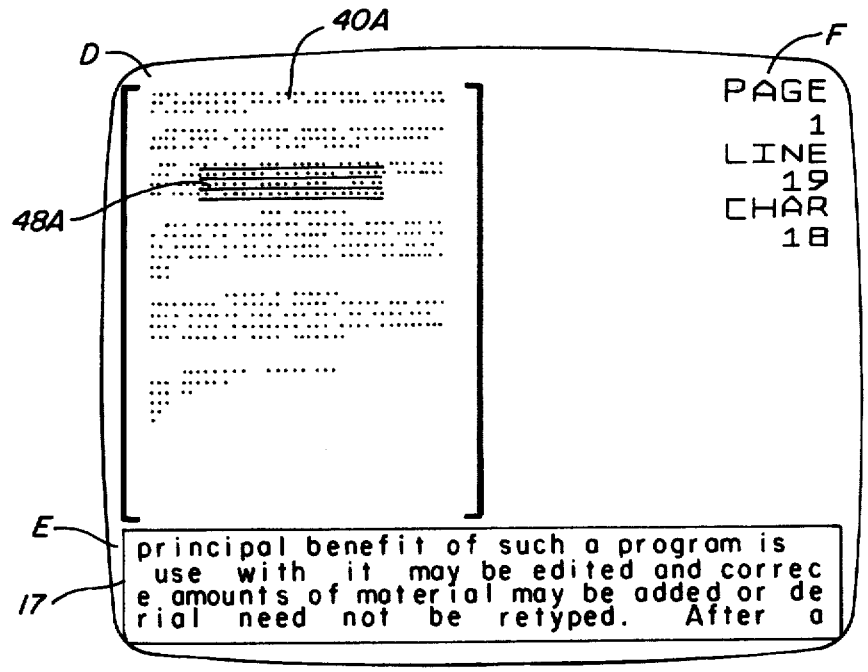
FIG._4.

METHOD AND APPARATUS FOR TEXT EDITING DISPLAY

The present invention pertains generally to word processing systems and, more particularly, to a method of displaying on a video display screen of the system a representation of the text material to be printed.

BACKGROUND OF THE INVENTION

Word processing, as it has become known today, broadly encompasses the storage, retrieval, manipulation, and distribution of information (usually in the form of printed text). The underlying concept of word processing involves the recordation and storage of key strokes in order to assist in correcting, revising, and manipulating text material. Word processing got its start in the early 1960s with the introduction of automatic typewriters equipped with a magnetic tape cartridge for recording typed material. These early automatic typewriters provided many advantages not previously available: They limited retyping to changes and corrections; they made possible the use of form letters having inserted personalized information; and they were capable of turning out in perfect form a final copy in much less time than the average typist could prepare.

Technological advances have substantially improved these early machines so that there now exists a wide range of much more advanced word processing systems. Today, keyboarded (i.e., typed) material is recorded in either electronic memories or on a variety of types of magnetic media such as, for example, tape, card, cassette or diskette. Upon command, the system retrieves the stored information and electronically assists in editing, correcting, revising, and manipulating the text. As before, retyping is limited to changes and corrections, and a perfect copy is automatically produced by pressing a button.

To further assist the user, some of today's word processing systems are equipped with a video display screen to provide one with a view of selected portions of the stored material so that any changes or corrections can be made without having to produce a typed or printed copy. Changes or corrections can be made and viewed on the screen; and actual printing on paper of the text is unnecessary until a final draft emerges from the system's printer unit. In short, video screen-equipped word processing systems allow text material to be keyboarded and displayed on the video screen for editing, formatting and the like before being printed.

Certain of the word processing systems equipped with a video display screen offer what is called a "full screen display," others provide what is termed a "window display." A full screen display provides a view on the display screen of that text material that would appear on an entire printed page; a window display, on the other hand, affords one a view of only a relatively small portion of a page of text.

Word processing systems capable of full screen display, therefore, provide a view of an entire page of text, allowing the user to quickly locate specific areas of the text on the page for changing and editing purposes; or, perhaps more importantly (at times), they provide a visual indication of the overall format and layout of the text as it will appear in a final printed version. However, in order to provide full screen display capability, the system requires a video screen of high resolution, which can be a costly item. So far as is known, only the more elaborate, large-scale, word-processing systems possess such full screen display capability.

A large portion of the video screen-equipped word processing systems in use today are relatively low-cost systems, designed and built to operate with low-resolution video display units. Such low-resolution display units are capable of displaying only a portion or "window" of what will ultimately become a printed page of text—hence, the phrase: window display. The user of such a system can "scroll" the displayed text (a feature conventionally provided) to locate the paragraph, sentence, and specific word or words requiring modification. But, an indication of the overall layout of the text as it will ultimately appear on a page can be obtained only by printing a draft of the text.

SUMMARY OF THE INVENTION

The present invention is directed to a method of displaying a graphic representation of a full page of text material on a video screen of a word processing system to provide an overall view of the format and layout of the text if printed. Broadly, the invention includes the steps of (1) representing each individual character of the text by a display object that is identical to all other character-representing display objects, each display object taking less space to display than the character it represents, and (2) displaying the display objects as a representation of what will be a printed page of text in a form and format corresponding substantially to the layout of the text that will be printed.

The preferred embodiment of the invention is disclosed herein as being used with a video display unit of the type having an election beam that forms a raster of horizontal scan lines. Each scan line includes a number of elemental beam positions or "pixels" at which the beam is turned on or off to produce, on the display screen, light or no light, respectively. The display object representing each character appears on the display screen as a single pixel, all displayed character-representing display objects form the graphic representation. Further, the visual graphic representation is displayed in conjunction with information indicative of text format such as, for example, margin settings, line spacing, tab settings, document identification, and the like.

In addition, a cursor symbol is displayed in superimposed relation with the graphic representation to provide an indication of that portion of the text that would be viewed on the display screen if true text were displayed, i.e., the cursor symbol represents the window of actual text that can be displayed. The cursor symbol can be moved over the display screen, relative to the graphic representation, in known fashion to allow a user to use the displayed graphic representation as a search format.

In an alternate embodiment of the invention, split screen viewing of information is provided. One portion of the display screen is used to display the graphic representation of text material with the cursor symbol superimposed thereon. A second portion of the screen displays that text material indicated as being encompassed by window—the superposition of the cursor on the graphic representation of text.

There are a number of advantages obtained by the present invention. Text material to be printed in final or hard copy can first be viewed in its representative form to determine the visual impact of the overall layout of one page, including margin settings, line spacings, paragraph spacings, headings, paragraph indentation, and similar formatting parameters. While the invention can be used by all types of word processing systems incorporating video display screens, this is particularly advantageous in those systems having the window display feature only.

A further advantage of the invention resides in the assistance given a user in searching areas of the text to be edited, changed, or modified in some way. Word processing systems having only window display capability require the operator to search blindly, so to speak, for the desired word or words of the text by starting at an initial portion of the text material and searching the text by scrolling until the desired area is found. However, if the operator has a general idea of the relative location within the text material of the matter that requires changing, the cursor symbol can be moved to a superimposed relation with corresponding location of the graphic representation, and the text encompassed by the window of the cursor symbol display.

With the alternate embodiment of the present invention, there is no need to switch between alternate display modes: one for displaying true text and the other for displaying the graphic representation. Rather, the graphic representation of a full page of text is displayed at one portion of the display screeen; at a second portion of the display screen is displayed a small part of the text. Selection of which portion of the representation is made by moving the the cursor symbol, which is superimposed on the graphic representation, to the desired location of the representation.

A clearer understanding and appreciation of the present invention, its objects and advantages will be apparent from a reading of the detailed description of the invention, taken in conjunction with the accompanying drawings.

BRIEF DESCRIPTION OF THE DRAWINGS

FIG. 1 illustrates the component parts of a representative word processing system;

FIGS. 2A and 2B illustrate the window of text material displayed on the display screen of the word processor system illustrated in FIG. 1 vis-a-vis an entire page of the text material;

FIG. 3A illustrates the graphic representation of the present invention;

FIG. 3B illustrates in greater detail a portion of the graphic representation of text illustrated in FIG. 3A; and FIG. 4 illustrates an alternate embodiment of the present invention which provides split screen, simultaneous viewing of a graphic representation of a full page of text and a portion of the page of text.

DETAILED DESCRIPTION OF THE INVENTION

The present invention is designed primarily for use with small, inexpensive word processing systems. One such system, formed from a microprocessor-based data processing system for home or (small) business use, is illustrated in FIG. 1, and designated generally by the reference numeral 10. As shown, the word processing system 10 includes a console 12 which carries a keyboard 14, a cathode ray tube (CRT) display unit 16 (typically a raster-scan type display), a printer 18, and a diskette unit 20. Interconnection between the various units of the word processor system 10 is made by the signal line 22 that connects the display unit 16 to the console 12, and the signal line 24 that connects the printer 18 and diskette unit 20 to the console 12 in daisy-chain fashion.

The console 12 houses much of the data processing electronics (not shown), usually in the form of a microprocessor and associated electronic equipment, for effecting control over and operating the system in the performance of its intended function. The console 12 is also configured to receive one or more memory modules 12a for providing the data processing electronics with resident data storage capability (as distinguished from the remote data storage capability provided by diskettes used with the diskette unit 20). The memory modules 12a will usually include both read-only-memory capability (for storing, for example, the supervisory program of the system) and random-access-memory (for storing program instructions that establish the various operating modes of the system—such as, for example, operation as a word processor).

Use of the word processing system 10 (and similar systems) is typically as follows: Material (i.e., text) is entered into the system by the use of the keyboard 14. Typically, the keyboarded material is conducted to and stored in the memory module 12a, where it remains available for correction and change. Using the computational capability inherent in any microprocessor-based system, the word processing system 10 can select, qualify, rearrange, or place the stored text material in sequence, and then automatically turn out the material as printed text 17 on a page 19, which will typically be typing paper or like material via the printer 18. The text material stored in the memory module 12a of the word processing system 10 can be transferred for more permanent storage to a diskette (not shown) via the disk unit 20, where it (the text material) can later be recalled for correcting, editing, or other modifications. These functions are conventional with any word processing system such as that shown in FIG. 1.

Often, it will be desired to review the keyboarded material for typograpical or other errors, or otherwise edit the material in some manner, before the material is printed. Accordingly, the word processor system 10 provides the user with a display of the text material on the display screen 17 for viewing. However, as hereinbefore noted, many word processing systems, such as the word processing system 10, are designed to operate with low resolution display units which can take the form of, for example, a home television set. Such dispaly units are limited in their display capabilities. For example, basic home television receivers are generally capable of providing a full-screen view of approximately twenty-four (24) lines of characters, each line of characters typically including 40 characters. Thus, if the display unit 16 is typical of the low-resolution units available today for use with low-cost word processors, it can provide for viewing 960 (24×40) characters of text. However, a full page (8½"×11") of printed text can hold up to approximately 6500 characters. Thus, it can be seen that only a portion of a page of text material can be viewed on the display screen 17 at any one time. Heretofore, to view an entire page of text on such systems the material had to be printed onto the page 19 for viewing and review.

In practical effect, the display screen 17 forms a "window" that can allow a user to select and view individual portions of the page of text. Selection of the portion to be viewed is typically effected by providing a "scrolling" operation: certain ones of the keys of the keyboard 14, keys 14a–14d, for example, may be designated to respectively cause the "window" to be moved (scrolled), relative to the page of text, up, down, left, or right, in order to provide viewing access to the entire page.

This window concept is diagrammatically illustrated in FIGS. 2A and 2B which shows a representative page 30 carrying text material 32. Due to the aforementioned limitations of the display unit 16, only selected portions of the text 32 can be called for display on the display screen 17. Thus, for example, only that portion 32, designated as text portion 34 in FIG. 2A and shown as being encompassed by the "window" 36 (illustrated in phantom on the page 30) will be displayed on the display screen 17a (FIG. 2B) as text portion 34a. Access to the entire text 32 for viewing is provided, as mentioned above, by scrolling the window as needed and displaying text portions 34a on the display screen 34a.

The only way heretofore known to obtain a view of the overall layout and format of the text 32 in such low-cost systems, as well as a convenient way to locate specific words or a group of words within the text 32, is to use the print unit 18 to print a draft of the text 32.

The present invention, a preferred embodiment of which is illustrated in FIGS. 3A and 3B, provides the alternative. As shown in FIG. 3A, a display screen 17b displayes a graphic representation 40 of the entire page of text 32. FIG. 3B illustrates how the graphic representation 40 is formed. Each character of the text 32 is represented by a display object 42, which is preferably a single elemental display element or "pixel," although larger display objects 42 could be formed by groupings of pixels. The display objects 42 are relatively positioned on the display screen 17 to correspond to the relative locations at which the characters they represent would appear on a printed page. Thus, the display objects 42 collectively form the graphic representation 40 which, in turn, provides a visual layout and format substantially corresponding to that of the text material 32 when printed. Thus, the graphic representation 40 provides one which information about the sentence spacing, sentence length, spacings between paragraphs, indentations, heading and header locations, and the like of the text as it will appear when printed—without the trouble of printing the material.

The graphic representation 40 is formed on the display screen 17 by activating the scanning electron beam of display unit 16 at each individual beam position or pixel to form a display object 42 for each character, and deactivating or turning off the electron beam to represent spaces between words such as at 44 in FIG. 3B. Thus, one line of text, containing as many 132 characters, can be represented in one horizontal scan line; each character in that line represented by a display object 42 formed by turning on electron beam at one of its elemental beam positions in the line scan. Spacing between each representative character lines is portrayed by one or more blank (i.e., no video) horizontal scan lines.

Also displayed, superimposed upon the graphic representation 40, is a window representation 48, formed from a plurality of horizontal lines of video 48a that interline a portion of the graphic display 40. Window representation 48 portrays the window 36 that encompasses that portion 34a of text 32 that will be displayed on the display screen 17 in the true text display mode illustrated in FIG. 2B.

In addition, margin designators 49a and 49b are respectively displayed on the left and right sides of the graphic representation 40. The margin designators 49a and 49b indicate the setting of the left and right margins of the text represented by the graphic representation 40.

As mentioned, display unit 16 can be a conventional television receiver and therefore capable of creating a display raster comprising approximately 200 active horizontal scan lines. The graphic representation 40 for text material 32 that will be printed on a page 30 of letter size (i.e., typically $8\frac{1}{2}'' \times 11''$) will take up no more than 80–100 scan lines. Thus, if the graphic representation 40 is displayed at one portion A (here, the mid-portion) of the display screen 17, the remaining portions B and C (comprising approximately 100–120 scan lines) can be, and in the present invention are, used to display additional information concerning the identification and layout of the material being edited or reviewed. Therefore, in connection with the present invention, the separate portion B of display screen 17 is used to display information identifying the material being edited. For example, illustrated in FIG. 3A, the graphic representation 40 is identified, indicated at B1, as being from a file that is stored on a diskette "D1," the file itself being identified as "PRACTICE." The state of the CAPS/LOWER key (LK:) of the keyboard, which may be either in the lower (L) case or upper (U), is indicated at B2 as being in upper case. The page of the PRACTICE file that the graphic representation portrays is indicated at B3 as P:1; the cursor (i.e., relative position of the "window" 36, as portrayed by the window representation 48) is indicated by the information at B4 and B5 as being located at line one (L:1), column one (C:1).

In the lower portion C of the display screen 17b of FIG. 3A are displayed formatting parameters, i.e., the parameter values that dictate the layout of the text when printed. Thus, at C1, the top, left, and right margins are indicated as being respectively set at two (2) lines from the top, one (1) character space from the left edge, and sixty-five (65) character spaces from the left edge of corresponding top and left edges of paper material 19 inserted in printer unit 18. At C2, there are three spacing parameters: line (which determines the number of blank lines that will be inserted between each line of text in a paragraph), paragraph (which determines how many blank lines will be inserted between each paragraph), and indent (which indicates the number of spaces to indent the first line of each paragraph). At C3 the parameter "PAGE SIZE" specifies the number of lines desired on a printed page; justification (JUST) determines whether or not the text is to be evenly spaced so that all line endings are uniform, and is selected by either an "ON" or an "OFF" notation, and a characters per inch (CPI) indicator which dictates how many characters per inch will be printed, if the printer has this option. Finally, at C4 is a TABS setting which dictates where to move the cursor each time the TAB key of the keyboard 14 is depressed.

Selection of the desired formatting parameters is effected by a user by merely depressing that key on keyboard 14 corresponding to letter displayed in inverse video (i.e., the letter itself is blank, surrounded by video as the T at 52).

In use, the word processing system 10 will be operated so that there are two information display modes: A first display mode presents for viewing the text portion 34a (FIG. 2B); a second display mode presents for viewing the graphic representation 40 of the present invention, together with other information (FIG. 3A). Selection between the two display modes is effected via the keyboard 14.

An alternate method of displaying information for text editing purposes is illustrated in FIG. 4. As shown, the graphic representation 40A of the text that will be printed is displayed on the screen 17B in a left portion D of the screen. Immediately below the display of the graphic representation, and extending the width of the screen, is the actual text that is covered by the window display object 48B. Thus, as the user selectively moves the window display object that is superimposed upon the graphic representation 40A of the text, he or she can see the actual text in the window E presented on the screen.

As with the preferred embodiment, the alternate embodiment illustrated in FIG. 4 has room for the display of additional information. Thus, at F on the display screen 17c there can be viewed information respecting the location of the window representation 48A, relative to the text portrayed by the graphic representation 40A. Thus, the window representation (actually the upper left-hand corner thereof) is indicated as being located within the text at the 18th character (CHAR) within the 19th line (LINE) of page 1 of the material.

In summary, there has been disclosed herein a method for displaying a graphic representation of a full page of text material on a display screen for text editing purposes. In addition, the graphic representation can be accompanied by further information describing the format parameters and other elements required by the user for text editing. Of course, it should be evident that various modifications of the present invention may be made without departing from the true spirit and scope of the invention. For example, the representation of each character may be more than just a single "dot" or beam placement.

A copy of a listing of the program used in implementing the present invention is enclosed with the specification to satisfy the completeness disclosure of the patent laws. However, it will be readily apparent to those skilled in the art of programming implementation of the present invention can be effected in a variety of ways, limited only by the imagination of the one implementing the invention.

What is claimed is:

1. In a word processing system of the type including means for operating a printer for printing text material on a page of recording material in the form of a plurality of characters arranged in a predetermined format and a video display unit for viewing at least selected portions of the text material, a method of providing a view on the video display unit of an overall format of the text as it will appear in printed form, the method comprising the step of:
   displaying on the video display unit the text material in the form of a graphic representation thereof, the graphic representation including a plurality of display elements each corresponding to one of the characters contained in the text material, the display elements being located within the graphic representation to correspond to the locations of the characters within the format.

2. The method of claim 1, including the alternative step of alternatively selecting and displaying a portion of the text material.

3. In a word processing system including printer means for printing on a page-by-page basis text material comprising a plurality of characters arranged on each page in a predetermined format, an electronic display device for displaying at least a portion of the text material before being printed, a method of viewing the format of text material to be printed on one page, the method comprising the steps of:
   representing each character by a display element, the display elements being substantially identical to one another; and
   displaying on the electronic display device a graphic representation of the one page of text material, the graphic representation being formed by the display elements, the relative positions of the display elements corresponding to the format of the text material.

4. The method of claim 3, including the step of displaying, with the graphic representation, format information indicative of the format of the text material that will be printed.

5. The method of claim 3, including displaying in superimposed relation with said graphic representation indicia indicative of the portion of the text material.

6. A method of displaying a graphic representation of text material to be printed on a record medium of predetermined size, the text material including a plurality of characters arranged in a predetermined format, the method comprising:
   providing a display symbol corresponding to each character, the display symbols being substantially identical to one another; and
   displaying the display symbols on a display screen at locations corresponding to the location within the text material of the corresponding character.

7. In a system including printer means for printing text material having a plurality of characters arranged in a predetermined format and an electronic display means for viewing at least a portion of the text material, a method for viewing on the display means the format of the text material to be printed, comprising:
   displaying for each character a display element at a location corresponding to the relative location of the character within the text material.

8. In a system including a printer means for printing text material onto a record medium in one page segments and an electronic display means for viewing at least a portion of the text to be printed on a one of the one page segments, a method of displaying a graphic representation of the text material that will be printed on a one-page segment, comprising the steps of:
   providing a plurality of identical display elements, each corresponding to a one of the characters to be printed; and
   displaying the display elements on the display screen at relative locations indicative of the locations at which each corresponding character will be printed on a one of the one page segments of the record medium.

9. In a word processing system of the type including a keyboard having a plurality of finger-depressible keys for entering text information, storage means for storing the entered text information, printing means for printing the text information comprising a plurality of characters in a predetermined format, and video display means for displaying a portion of the text information, a method of viewing the format of the text information as it will appear in printed form, the method comprising the steps of:
   representing each of the characters of the text information with a display object, the display objects being substantially identical to one another; and displaying the display objects on the video display means at locations corresponding substantially to the relative locations of the corresponding characters within the text information when printed.

10. The method of claim 2, including the step of displaying a cursor representation in superimposed relation with a first segment of the graphic representation, the first segment corresponding to the portion of the text material selected and displayed in the alternative step.

11. The method of claim 10, including the step of selectively moving the cursor representation relative to the graphic representation, thereby selecting the portion of the text material for the display in the alternative step.

12. The method of claim 10, wherein the cursor representation is formed from a plurality of horizontal lines that combine to form a substantially rectangular configuration.

13. The method of claim 12, wherein the horizontal lines are spaced apart.

14. The method of claim 13, wherein the display elements are arranged in a plurality of horizontal rows, and the horizontal lines are interleaved with the horizontal rows.

15. The method of claim 1, further including the step of displaying a cursor representation in superimposed relation with a first segment of the graphic representation; and the step of simultaneously displaying that portion of the text material corresponding to the first segment of the graphic representation.

16. The method of claim 15, including the step of selectively moving the cursor representation relative to the graphic representation, thereby selecting the portion of the text material displayed.

17. The method of claim 16, wherein the cursor representation is formed from a plurality of horizontal lines that combine to form a substantially rectangular configuration.

18. The method of claim 17, wherein the horizontal lines are spaced apart.

19. The method of claim 18, wherein the display elements are arranged in a plurality of horizontal rows, and the horizontal lines are interleaved with the horizontal rows.

20. The method of claims 14 or 19, the word processing system including keyboard means having a number of finger-depressible keys, wherein the step of selectively moving the cursor representation includes the step of depressing at least one of the finger-depressible keys.

21. In a word processing system of the type including a keyboard having a plurality of finger-depressible keys for entering and formating text information comprising a plurality of characters, storage means for storing the text information, printing means for printing the text information, and video display means for displaying a portion of the text information, apparatus for displaying the format of the text information, the apparatus comprising:

means for forming a display object for each of the characters of the text information, the display objects being substantially identical to one another; and means for displaying the display objects on the video display means at locations corresponding substantially to the relative locations of the characters within the text information to form a graphic representation having a format substantially the same as that of the text material.

22. The apparatus of claim 21, wherein the portion of the text information and the graphic representation are alternatively displayed on the video display means; and including means for selecting for display the graphic representation or the portion of the text material.

23. The apparatus of claim 21, including means for displaying the portion of text information and the graphic representation simultaneously.

24. The apparatus of claim 22, wherein the means for selecting is responsive to at least one of said finger-depressible keys.

25. The apparatus of claim 21 further including window means for forming a window representation and for displaying the window representation in superimposed relation with a segment of the graphic representation, there being a plurality of superposed display objects defined by the superposition of the window representation and the segment of the graphic representation, the characters of the portion of the text information corresponding to the superposed display objects.

26. The apparatus of claim 25, including means for moving the window representation relative to the graphic representation.

27. The apparatus of claim 26, where the window representation is movable in response to actuation of at least one of the finger-depressible keys.

28. The apparatus of claim 25, including means for forming the window representation from a plurality of horizontal lines arranged to form a substantially rectangular configuration.

29. The apparatus of claim 28, including means for forming the horizontal lines in spaced-apart relation to one another.

30. The apparatus of claim 29, including means for displaying the display elements in a plurality of horizontal rows and for interleaving the horizontal lines with the horizontal rows.

31. In a word processing system, including a keyboard for entering text material, a printer for displaying the text material in the form of a plurality of characters having relative positions that define a format and video display means for displaying at least a portion of the text material, the characters of the displayed text material having horizontal and vertical dimensions that are no less than M and N, respectively, apparatus for providing a representative view of the format, the apparatus comprising:

means for forming a display object for each character of the text material, the display objects being substantially identical to one another; and means for displaying the display objects at relative locations that emulate the relative locations of the corresponding characters of the text material, the display objects each having respective horizontal and vertical dimensions of X and Y when displayed, where $X<M$ and $Y<N$.

* * * * *